May 29, 1956   G. K. NEWELL   2,747,701
BRAKE LINING WITH WIRE REINFORCEMENT
Filed Dec. 7, 1950
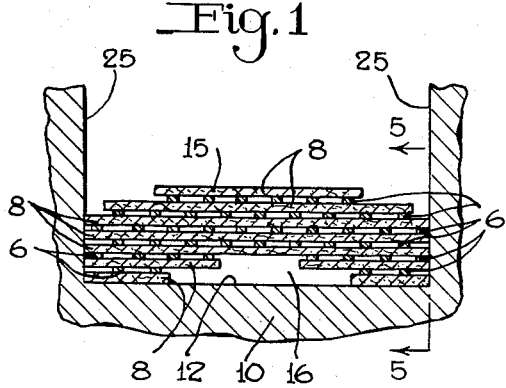
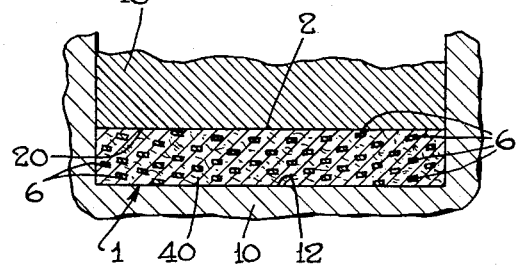
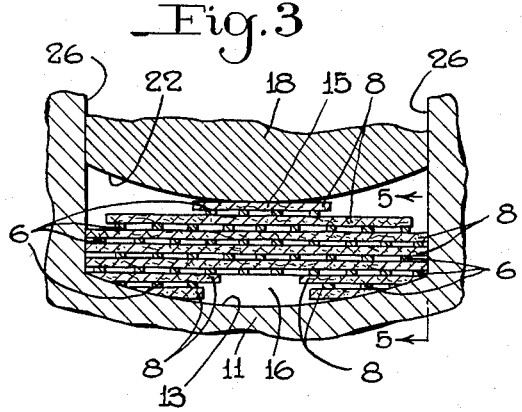
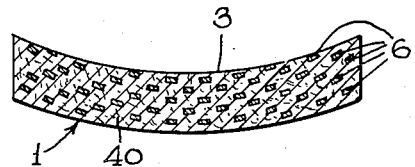
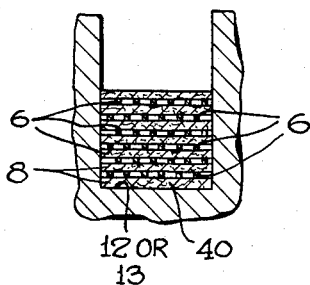
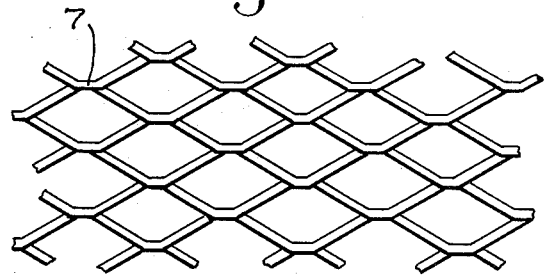
INVENTOR.
George K. Newell
BY
Frank E. Miller,
ATTORNEY

2,747,701

BRAKE LINING WITH WIRE REINFORCEMENT

George K. Newell, Pitcairn, Pa., assignor to Westinghouse Air Brake Company, a corporation of Pennsylvania Application December 7, 1950, Serial No. 199,593

2 Claims. (Cl. 188—251)

This invention relates to composite brake blocks and more particularly to an arrangement of metal reinforcement comprised in such block as well as the method whereby such arrangement may be accomplished.

Heretofore, composite brake blocks have utilized as reinforcement foraminated sheets of metal, such as sheets of expanded metal, embedded in a matrix to form a composite brake block for use as the friction braking element in brake apparatus. Such embedded foraminated sheets of metal form a meshwork within the brake block and are intended to strengthen such block mechanically, reinforcing the matrix material which has desirable friction, heat resistant, and wear properties to assure that such a brake block will not disintegrate when subjected to the usual stresses imposed during service.

It has been the practice to embed a foraminated sheet of reinforcement metal at spaced apart intervals throughout the entire thickness of a brake block of the above type. Each embedded foraminated sheet of reinforcement metal was disposed parallel to the friction braking surface of the brake block; in a plane parallel to the braking surface in the case of flat friction braking surface, for example, and in coaxial fashion in the case of a concave friction braking surface. As matrix wear progressed, the brake block diminished in thickness, exposing successively each sheet of the various parallel sheets of foraminated reinforcement metal, which sheet then becomes part of the braking surface and subject to wear. During the life of such a brake block, the braking surface is therefore formed alternately of matrix material alone and matrix material plus reinforcement metal. Since the material forming the friction braking surface of such a brake block changes as above, the friction properties of such block also change, which is undesirable from the standpoint of dependability and safety. Moreover, when a sheet of reinforcement material becomes fully exposed at the braking surface it may drop out of the shoe in pieces or as a whole and materially shorten the life of the block.

In view of the foregoing, it is a prime object of the invention to provide an improved composite brake block of the above general type but free of the above mentioned undesirable characteristics.

Other objects and advantages will become apparent from the following more detailed description of the invention taken in connection with the accompanying drawing in which:

Figs. 1 and 2 are consecutive views in cross-section showing the method of fabrication of a composite brake block of the flat type embodying the invention;

Figs. 3 and 4 are consecutive views in cross-section showing the method of fabrication of a composite brake block of the concave type embodying the invention;

Fig. 5 is a view in section taken along the lines 5—5 in Figs. 1 and 3; and,

Fig. 6 is a plan view of a common type of foraminated metal, suitable for reinforcement of the composite brake block according to the invention.

Description

Referring to the drawing, according to the invention, I provide a composite brake block 1 comprising a matrix material 40 shaped to form such as a flat friction braking surface 2 for use in a disk type brake or such as a concave friction braking surface 3 for contact with a brake drum or with the rim of a wheel on a railway vehicle; other shapes such as convex etc. being taken for granted. The composition of the matrix material 40 is not herein claimed to be new, but, for sake of illustration, may consist of a mixture of Buna rubber, asbestos fibre, and granulated cast iron.

According to a feature of the invention, a plurality of spaced apart substantially parallel layers of foraminated metal sheets or members 6, such as expanded metal 7 (Fig. 6), are embedded in the matrix 40 longitudinally through the brake block and arranged preferably in substantially concentric fashion at a radius or radii lesser than that of the friction braking surface 2 or 3. By virtue of such an arrangement of reinforcing sheets 6 the brake block 1 is adequately strengthened to resist fracture while the curvature of such sheets results in exposure of only the ends of such sheets 6 where same intersect the braking surface 2 or 3. As the thickness of the brake block 1 reduces due to wear of the braking surface, the braking surface 2 or 3 always will be composed of exposed ends of sheets 6 and matrix material 40, and the number of such exposed ends will be substantially constant due to the even spacing of the sheets, thereby resulting in consistent friction properties throughout the life of the brake block. Moreover none of the sheets 6 will ever be exposed for frictional contact with an element to be braked for any material portion of its length so as to prevent such sheets dropping out of the block as may occur in prior structure, as above mentioned.

Method of fabrication

Referring to Figs. 1, 2 and 3, a die 10 or 11 open at the top is provided, for example, which has a flat bottom surface 12 or a concave bottom surface 13 according to whether or not a flat 2 or a concave 3 braking surface, respectively, is desired. In either case, alternate layers of sheets 8 of semi-plastic matrix material 40 and foraminated sheets 6 of reinforcement metal are stacked in the respective die 10 or 11 in substantially flat layers. According to the invention, the lowermost layers are not continuous from end to end of the block but are made up of divided lengths graduating upwardly to continuous sheets to form a central evacuated space 16, substantially arcuate in shape, exposed to the bottom surface 12 or 13 of the respective die 10 or 11. On top of the continuous layers formed by alternate sheets 8 of matrix material and sheets 6 of reinforcement metal are placed graduated alternately sheets 6 and 8 of foraminated metal and matrix, respectively, to form an arcuate hump 15 in the middle of the top of the stack. A plunger 16 or 18, having a flat pressure face 20 or a convex pressure face 22, respectively, is introduced into the die 10 or 11, respectively, to exert great pressure atop the stack of alternate composite brake block sheets 6 and 8. By virtue of such pressure the alternate sheets 6 and 8 will be compacted to form the flat faced or concave faced brake block, with matrix material 40 flowing into the openings in the foraminated sheets 6 and maintaining such sheets spaced apart in embedded layers. By virtue of the evacuated space 16 at the bottom of the stack of sheets 6 and 8 and the hump 15 atop such stack formed prior to compacting, during compacting the sheets 6 and 8 will be bent downwardly out of their flat shape into a curvature of radius less than that of the bottom surface 12 or 13 of the die 10 or 11, respectively, hence of the brake block braking surface 2 or 3 formed by such surface 12 or 13, respectively; the layers forming the hump 15 are bent downwardly to cause lower layers to fill the space 16, while only vertical compaction of the layers occurs immediately adjacent to the end walls 25 or 26 of the die 10 or 11, respectively.

*Summary*

In view of the foregoing, it will be appreciated that I have provided a metal reinforced type of composite brake block which is mechanically strong and, due to uniformity of matrix material and reinforcement metal forming the braking face of the block during wear, such block possesses stable friction properties.

Having now described my invention, what I claim as new and desire to secure by Letters Patent, is:

1. A brake block assemblage comprising a body of composition friction material molded with a braking surface having a radius of curvature conforming substantially to the radius of curvature of a rotatable element to be braked thereby, and a plurality of longitudinally curved foraminated metallic reinforcing members embedded in said body in spaced concentric relationship with each other in the direction of the thickness of said body as measured from the braking surface and with respective radii of curvature less than the radius of curvature of the braking surface, the respective centers of curvature of which radii are so located that only the opposite longitudinal ends of said members are exposed to the braking surface and the portions thereof intermediate said ends are embedded in said body away from said braking surface, and such that during wear of the braking surface of said body through use the opposite ends of said members exposed to said braking surface will be progressively worn and thereby reduce the length of such intermediate portions until each of said members is successively substantially worn away, and such that until each of said members is thus worn away the corresponding intermediate portions thereof will be protected from wear and continue to provide reinforcement by remaining embedded in said body without exposure to said braking surface.

2. A brake block assemblage comprising a body of molded composition friction material formed with a braking surface of a radius of curvature substantially that of the radius of curvature of a rotatable element to be braked thereby, and a plurality of curved foraminated metallic sheets embedded in spaced relation throughout the thickness of said body in a direction away from said braking surface, said sheets serving to reinforce said body while also providing substantially uniform friction characteristics to the braking surface by being formed with respectively larger radii of curvature and in substantially concentric spaced relation, the sheet having the smallest radius of curvature being closest to the braking surface and the other sheets being progressively removed from the braking surface in said direction into the body of material, the radius of curvature of each of said sheets being sufficiently less than the radius of curvature of the braking surface and having a center of curvature so located that only the opposite ends of each sheet are exposed to the braking surface while the middle portion is firmly embedded in the body against dislodgement from the body during wear of the braking surface and of each sheet progressively from the opposite ends thereof toward the middle thereof.

References Cited in the file of this patent

UNITED STATES PATENTS

| | | |
|---|---|---|
| 587,493 | Sargent | Aug. 3, 1897 |
| 995,013 | Jones | June 13, 1911 |
| 1,121,209 | Tatum | Dec. 15, 1914 |
| 1,159,008 | Gallagher et al. | Nov. 2, 1915 |
| 1,202,529 | Jones | Oct. 24, 1916 |
| 1,205,482 | Reid | Nov. 21, 1916 |
| 1,402,117 | Thompson | Jan. 3, 1922 |
| 1,932,919 | Albert et al. | Oct. 31, 1933 |
| 2,061,919 | Nanfeldt | Nov. 24, 1936 |
| 2,125,524 | Smith | Aug. 2, 1938 |
| 2,136,370 | Bockius et al. | Nov. 15, 1938 |